United States Patent
Anderson et al.

(10) Patent No.: US 11,046,180 B2
(45) Date of Patent: Jun. 29, 2021

(54) SYSTEM AND METHOD FOR CONTROLLING TRACK SLIP OF A MACHINE

(71) Applicant: Caterpillar Inc., Deerfield, IL (US)

(72) Inventors: Randall T. Anderson, Peoria, IL (US); Timothy A. Evans, Washington, IL (US)

(73) Assignee: Caterpillar Inc., Peoria, IL (US)

(*) Notice: Subject to any disclaimer, the term of this patent is extended or adjusted under 35 U.S.C. 154(b) by 486 days.

(21) Appl. No.: 15/970,205

(22) Filed: May 3, 2018

(65) Prior Publication Data
US 2019/0337386 A1 Nov. 7, 2019

(51) Int. Cl.
*B60K 28/16* (2006.01)
*E02F 9/20* (2006.01)

(52) U.S. Cl.
CPC .............. *B60K 28/16* (2013.01); *E02F 9/202* (2013.01); *E02F 9/2062* (2013.01); *B60Y 2300/18175* (2013.01); *B60Y 2400/303* (2013.01); *B60Y 2400/85* (2013.01)

(58) Field of Classification Search
CPC ........ B60K 28/16; E02F 9/2062; E02F 9/225; B60Y 2300/18175; B60Y 2400/85; B60Y 2400/303; B60W 2520/26; B60W 2710/0666; B60W 40/10; B60W 30/181; B60W 30/18172; B60W 10/04; B60W 10/06; B60W 2300/44; B60W 2300/45
See application file for complete search history.

(56) References Cited

U.S. PATENT DOCUMENTS

| | | | |
|---|---|---|---|
| 4,986,377 A * | 1/1991 | Moriarty | B60K 17/348 180/6.5 |
| 5,219,411 A | 6/1993 | Yamamoto et al. | |
| 5,287,280 A | 2/1994 | Yamamoto et al. | |
| 5,560,431 A * | 10/1996 | Stratton | A01B 63/1117 172/2 |
| 7,337,054 B2 | 2/2008 | Pandey et al. | |
| 8,983,739 B2 | 3/2015 | Faivre | |
| 9,005,081 B2 | 4/2015 | Anderson | |
| 9,086,698 B2 | 7/2015 | Faivre et al. | |
| 9,127,436 B2 * | 9/2015 | Nakagawa | B60W 30/1888 |
| 2009/0177337 A1 * | 7/2009 | Yuet | G05D 1/0044 701/2 |
| 2013/0168179 A1 * | 7/2013 | Will | F16H 61/472 180/338 |
| 2017/0113697 A1 | 4/2017 | Faivre | |

* cited by examiner

Primary Examiner — Minnah L Seoh
Assistant Examiner — Maurice L Williams
(74) Attorney, Agent, or Firm — Calfee, Halter & Griswold LLP

(57) ABSTRACT

A method, system, and machine for controlling the output of an engine of a machine includes calculating the difference between a measured track slip based on track speed and ground speed and a calculated target track slip depending on track speed and chassis pitch, inputting the difference into a controller to determine a propulsion engine torque limit, and limiting the engine toque to the propulsion engine torque limit plus a steering system input torque.

18 Claims, 4 Drawing Sheets

SYSTEM AND METHOD FOR CONTROLLING TRACK SLIP OF A MACHINE

TECHNICAL FIELD

The present disclosure generally relates to self-propelled machines, and more specifically to controlling the engine output of self-propelled machines during operation.

BACKGROUND

When operating self-propelled machines, such as track-type tractors, particularly in loose soil, the ground-engaging track may cause the soil to shear, resulting in track slip. In such a situation, the wheels, gears, or other drivers of the track, which are powered by the engine, will cause the track to rotate at a higher velocity than the chassis will move in relation to the ground. Such track slip results in energy and fuel loss as well as excessive wear on the tracks.

Expert users can accommodate for track slip, but it is a difficult skill to learn and requires considerable experience and mental focus. Particularly, once a user notices that the track is slipping, he or she may decelerate the vehicle and thereby decrease the output torque from the engine to prevent over-rotation of the track. However, track slip often occurs when the machine is being operated for its intended purpose and is subjected to an excessive load, such as bulldozing a considerable amount of soil. In such event, to accommodate the slip, the user must focus on the load and the slip simultaneously and decelerate the machine while still maintaining control of the machine's peripheral accessories, such as a blade or bucket. The simultaneous operation results in considerable mental and physical fatigue for the expert user. Accordingly, it is beneficial to automatically monitor and reduce track slip to allow a user to reduce undercarriage and track wear, increase fuel economy, and reduce user fatigue by allowing a user to concentrate fully on tasks, such as blade control.

U.S. Pat. No. 5,287,280, titled "Method and apparatus for controlling shoe slip of crawler vehicle," discloses a method of reducing engine for controlling track slip once track slip is detected by setting a cut-off mode to reduce the engine power output of an engine to a predetermined value. However, this patent does not calculate a dynamic torque limit which factors in chassis pitch or steering pump torque. Accordingly, a system and method is needed to automatically and continuously limit the torque supplied by the engine based on chassis pitch and factoring in steering pump torque.

SUMMARY

In accordance with embodiments of this invention, there are provided methods for controlling an engine torque of a machine having an engine initially operating at an initial output torque. The methods include the steps of calculating a first target track slip from a track speed of a traction device of the machine, calculating an actual track slip from the difference between the track speed and a ground speed of the machine, determining a total engine torque limit based on a difference between the actual track slip and the target track slip, and limiting the initial output torque to the total engine torque limit.

In accordance with other embodiments, there are provided systems for controlling track slip of a track-type tractor having continuous tracks and an engine initially operating at an initial output torque. The systems include a traction device speed sensor that provides a signal indicative of a track speed of the track-type tractor, a chassis pitch sensor that provides a signal indicative of a chassis pitch of the track-type tractor, a ground speed sensor that provides a signal indicative of a ground speed of the track-type tractor, a steering system input torque sensor that provides a signal indicative of a steering system torque of the track-type tractor, and a controller operably connected to the traction device speed sensor, the chassis pitch sensor, the ground speed sensor, the torque sensor, the engine speed sensor, the steering pump sensor, and the engine. The controller receives the signals for the track speed, the chassis pitch, the ground speed, and the steering system torque. The controller is also configured to calculate a total engine torque limit from the received signals. Further, the controller sends a control signal to the engine which limits the initial output torque to the total engine torque limit.

In accordance with other embodiments, there are also provided machines for performing work functions. The machines include at least one traction device which contacts a ground and may rotate about a chassis of the machine, an engine capable of producing an output torque, a traction device speed sensor that produces a signal indicative of a track speed of the at least one traction device, a ground speed sensor that produces a signal indicative of a ground speed of the machine, and a controller operatively connected to the engine, the at least one traction device, the chassis pitch sensor, and the ground speed sensor. The controller may receive the signals produced by the traction device speed sensor, and the ground speed sensor. The controller may also determine a total engine torque limit from the received signals. Further, the controller may send a control signal to the engine which limits the output torque of the engine to the total engine torque limit.

BRIEF DESCRIPTION OF THE DRAWINGS

Further features and advantages of the invention will become apparent from the description of embodiments using the accompanying drawings. In the drawings.

DETAILED DESCRIPTION

Figure 1:
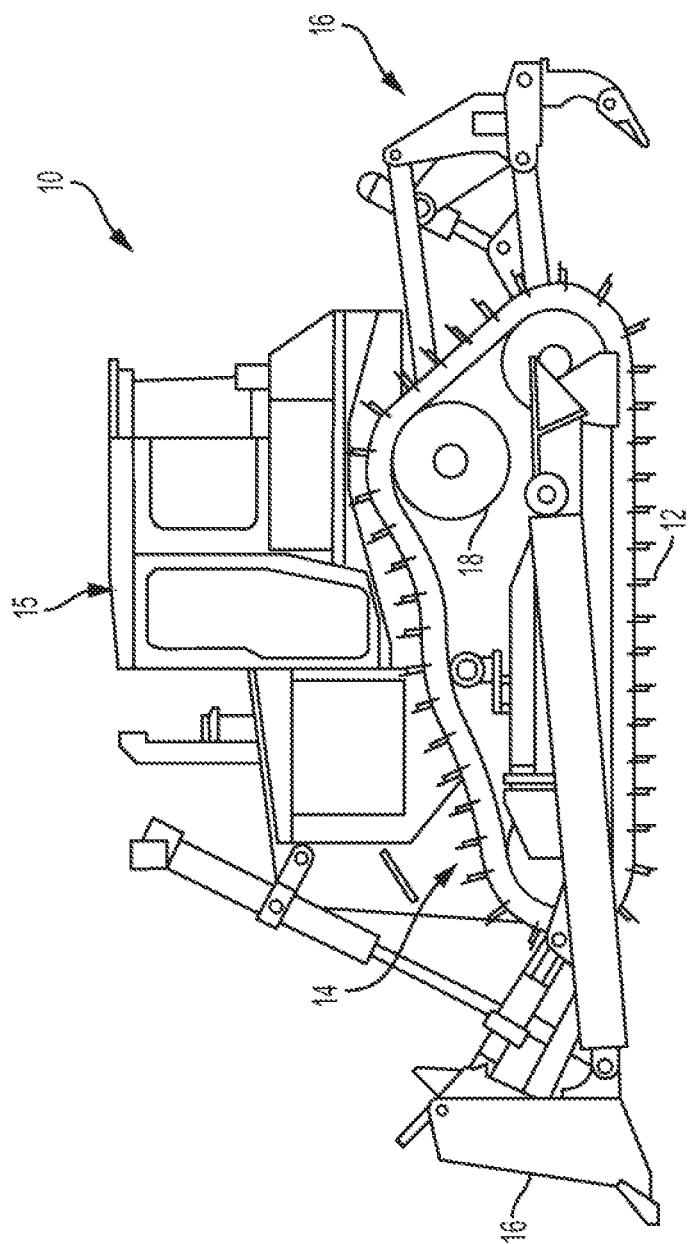
FIG. 1 depicts an exemplary track-type tractor machine according to the disclosure.

Turning to FIG. 1, a simplified view of an exemplary mobile machine 10 is depicted. The machine 10 includes at least one traction device 12, such as a track or wheel, which may contact the ground and steer and/or propel the machine 10. The machine 10 also includes a chassis 14 which secures the traction devices 12 to the remainder of the machine 10. The chassis 14 may include a cab 15 in which a user may sit and operate the machine 10 through steering wheels, levers, or other control mechanisms. The machine 10 may have at least one work implement 16, such as an earth-moving blade or ripper operable by the control mechanisms and movable by way of one or more motors or hydraulic cylinders, for performing operations.

In the illustrated embodiment, the machine 10 is a track-type tractor and the traction devices 12 are a pair of continuous or endless tracks which are substantially parallel and rotatable about the remainder of the machine 10. A plurality of sprockets 18 are connected or interlocked with the tracks 12 to rotate the tracks 12 when a torque is exerted by an engine.

While the illustrated machine 10 is a track-type tractor, it will be appreciated that the machine 10 may be other tracked machines, such as a track loader excavator, feller bunchers, etc., or wheeled vehicles such as mining trucks, off-highway or on-highway trucks, wheel loaders, motor graders, etc. Thus, the traction devices 12 may be wheels, a combination of tracks and wheels, or any other device known in the art to move a machine. Additionally, the machine 10 may have more than one pair of continuous tracks.

Figure 2:
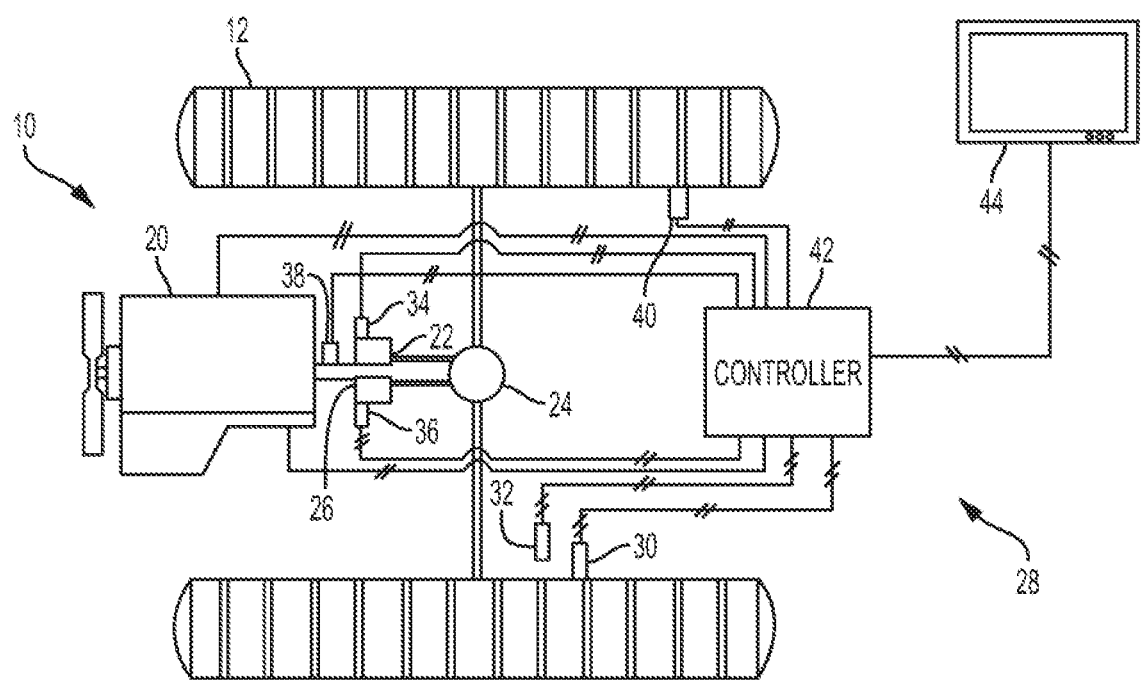
FIG. 2 is a diagrammatic illustration of a track-type tractor control system for the track-type tractor machine of FIG. 1.

As depicted in FIG. 2, the machine 10 may include an engine 20 and a transmission 22 coupling the engine 20 to the traction devices 12. In a preferred embodiment, the transmission 22 couples the engine 20 to the traction devices 12 via the sprockets 18. However, it will be appreciated that other configurations are encompassed. For example, if the traction devices 12 are wheels, no sprockets 18 may be used.

The engine 20 provides power output or torque to the traction devices 12 to rotate the traction devices 12 and thereby steer and/or otherwise maneuver the machine 10. The operation of the traction devices 12 and the at least one work implement 18 may be controlled by a user using a plurality of levels or other control mechanisms which may at least partially control the output of the engine 20. The engine 20 may be of any type that has a reduceable torque output. In an exemplary embodiment, the engine 20 is electronic. However, the engine 20 may be a non-combustion source of power such as a fuel cell, a power storage device, or similar mechanism or the engine 20 may be an internal combustion engine such as a diesel engine, a gasoline engine, a gaseous fuel powered engine, or any other type of engine apparent to one skilled in the art.

The engine 20 may be connected to the transmission 22 via a direct mechanical coupling, an electric or hydraulic circuit, or in any other suitable manner. The transmission 22, in some embodiments, may include a torque converter drivably connected to the engine 20. The transmission 22 may produce a stream of pressurized fluid directed to a motor associated with at least one traction device 12 to drive the motion thereof. Alternatively, the transmission 22 could include a generator configured to produce an electrical current used to drive an electric motor associated with any one or all of traction devices 12, a mechanical transmission device, or any other appropriate means known in the art. In a preferred embodiment, the output of the transmission 22 may be the input into a differential steering gear box 24 which in turn rotates the traction devices 12. The differential steering gear box 24 may rotate the traction devices 12 via driveshafts connecting the gear box 24 and traction devices 12 or sprockets 18.

The machine may further include a steering system 26 connected to the engine 20. The steering system 26 is powered or otherwise operated by the engine 20 to produce a force or torque capable of steering the machine 10 (e.g., turning the machine 10 right or left). The steering system 26 may be powered or otherwise operated by the output torque of the engine 20. In a preferred embodiment, the steering system 26 steers the machine by outputting torque to one or more of the traction devices 12. In a preferred embodiment, the steering system 26 is driven by the engine 20 to provide a rotational steering system output to the differential steering gear box 24 which, along with the transmission 22 output, rotates the traction devices 12.

In a preferred embodiment, the machine 10 may additionally include a control system 28 in communication with components of the machine 10 and engine 20 to monitor and affect the operation of the machine 10. The control system 28 may include at least one ground speed sensor 30, at least one chassis pitch sensor 32, a transmission output speed sensor 34, a steering system input torque sensor 36, an engine speed sensor 38, and at least one traction device speed sensor 40. The machine 10 may further include a controller 42 which is operably and communicatively connected to the at least one ground speed sensor 30, the at least one chassis pitch sensor 32, the transmission output speed sensor 34, the steering system input torque sensor 36, the engine speed sensor 38, the at least one traction device speed sensors 40, the engine 20, and an operator interface device 44. As will be explained below, the controller 42 may receive input signals from the sensors to calculate a total engine torque limit and then send a control signal to the engine 20 to limit the torque output to accommodate for track slip.

The at least one ground speed sensor 30 may be used to determine the ground speed (Vg), or the overall velocity or speed of the machine 10 in relation to the ground. In a preferred embodiment, the ground speed sensor 30 is an electronic receiver that determines the ground speed by monitoring the position of the machine 10 over time using global positioning systems ("GPS") and filtering the time and positioning data with an accelerometer. By calculating the ground speed in such a manner, the absolute speed of the machine 10 in relation to the ground may be closely approximated while accounting for any potential changes in elevation. However, it will be appreciated that the ground speed may be determined by any suitable means. For example, the ground speed sensor 30 may be and/or include an electronic receiver that communicates with a local radio or laser transmitting system to determine a relative location and speed of itself, a receiver which triangulates a relative 3-D position and speed from radio or laser signals from multiple locations, a ground-sensing radar system to determine the travel speed of the machine 10, an Inertial Reference Unit (IRU), a position sensor associated with the traction device 12, or any other known locating and speed sensing device operable to receive or determine positional information associated with a machine. A signal indicative of this ground speed or, alternatively, of the raw positional and time data, may be communicated from speed sensor 30 to the controller 42 via its communication link. While the ground speed sensor 30 is depicted as being attached or near the traction devices 12, the ground speed sensor 30 may be at any suitable location on the machine 10.

The at least one chassis pitch sensor 32 may measure a chassis pitch representing the pitch or angle of orientation of the front end of the machine 10 in relation to the rear end, which corresponds to the surface grade the machine 10 is traversing. The chassis pitch sensor 32 is preferably located on the chassis 14 of the machine 10 but may be located on any stable surface of the machine 10. In a preferred embodiment, the chassis pitch sensor 32 determines the chassis pitch using an inertial measurement unit ("IMU") by measuring the longitudinal acceleration and pitch rate of the machine 10. However, it will be appreciated that the chassis pitch may be calculated by other means. For example, the chassis pitch sensor 32 may be and/or include an inclinometer gyroscope, level, multiple GPS devices positioned variously around the machine 10, or any other instrument known in the art, either separately or in combination. A signal indicative of this chassis pitch may be communicated from the chassis pitch sensor 32 to the controller 42 via its communication link.

The transmission output speed sensor 34 may be operably associated with the transmission 22 to directly sense output speed of transmission 22. It is contemplated that alternative techniques for determining output speed may be implemented such as monitoring various parameters of the track-type tractor 10 and responsively determining a value of output speed from the transmission 22, or by monitoring a speed command sent to the transmission 22. In a preferred embodiment, the transmission output speed sensor 34 may send to the controller 42 a signal indicative of the output speed of the transmission 22. However, other embodiments are contemplated. For example, engine speed, torque converter output speed, transmission output speed, and other parameters may be used, as is well known in the art, to compute output speed from the transmission 22 which may then be sent as a signal to the controller 42.

The steering system input torque sensor 36 may measure or otherwise determine the input torque necessary for the steering system 26 to maintain steering performance of the machine 10. The steering system input torque sensor 36 may be mounted to the steering system 26 to sense the steering system input torque. Alternatively, the steering system input torque sensor 36 may be a pressure sensor used along with commanded pump pressure to calculate the requisite steering system input torque. In a further alternative embodiment, the steering system input torque sensor 36 may embody a strain gauge-type sensor, a piezoresistive type pressure sensor, or any other type of pressure sensing device known in the art. In an exemplary embodiment, the steering system input torque sensor 36 may communicate with the controller 42 which receives user control input signals from the control mechanisms in the cab 15 to dynamically determine the steering system command necessary to maintain current steering performance. The steering system input torque sensor 36 may send a signal indicative of the steering system input torque to the controller 42 via an associated communication link.

The engine speed sensor 38 may be operably associated with the engine 20 to detect the speed or output of the engine 20. In one exemplary embodiment, the engine speed sensor 38 may measure the rotations per minute (rpm) of an output shaft or cam shaft. In a preferred embodiment, based on the operating speed of the engine 20, the engine speed sensor 38 may calculate the maximum available output torque for the engine 20 at the particular speed. In a further preferred embodiment, the engine speed sensor 38 determines the maximum available output torque of the engine 20 based on predetermined computations of the maximum amount of torque the engine 20 may produce at particular operating speeds. A signal indicative of the maximum available output torque of the engine 20 or, alternatively, the raw operating speed data of the engine 20, may be communicated from the engine speed sensor 38 to the controller 42 via its communication link.

The traction device speed sensor 40 may be used to determine the rotational or track speed (Vt) of the traction devices 12. In a preferred embodiment, the track speed is calculated by monitoring the output of the transmission 22 and is taken as the average track speed. For example, the traction device speed sensor 40 may be a rotating speed sensor located on the output of the transmission 22 to calculate the rotational speed of the sprockets 18 when the rotational speed of all sprockets 18 are equal, which may thereby be used to calculate the track velocity. Alternatively, if the traction devices 12 are wheels, the rotating speed sensor may be located directly on the wheel. However, the track velocity Vt may also be inferred from a transmission input or output speed. In a further preferred embodiment, the traction device speed sensor 40 determines the average rotational or track speed of the traction devices 12 over a period of time. Additionally, multiple traction device speed sensors 40 may be used. For example, a traction device speed sensor 40 may be used at each track or wheel of the machine 10. A signal indicative of the track speed of the traction devices may be communicated from each of the traction device speed sensors 38 to the controller 42 via its communication link.

In a preferred embodiment, the machine 10 includes a traction device speed sensor 40 for each traction device 12 or a single traction device speed sensor 40 is capable of determining the track speed for each traction device 12. In a further preferred embodiment, traction device speed sensors 40 are placed on and able to measure the output speeds of the transmission 22 and the steering system 26. The transmission 22 and steering system 26 may be attached to the differential planetary gearbox 24 which has a left and right driveshaft. The left and right driveshafts are connected to the sprockets 18 which turn the left and right traction devices 12, respectively. By measuring the output speeds of the transmission 22 and steering system 26 while knowing the operational factors of the gearbox 24 and driveshafts, the track speed of each traction device 12 may be determined independently. In a still further preferred embodiment, the steering system 26 increases the track speed of one traction device 12 by the same amount that it decreases the track speed of the other traction device 12. Using the output speed of the transmission 22 and then scaling the amount by the correct ratios relating to the steering system 26 may be equivalent to taking the average track speeds of left and right traction devices 12.

In a further preferred embodiment, the machine 10 includes an operator interface device 44 having a display portion which allows a user to monitor the machine 10 and a user portion which allows a user to control functions of the machine 10. The display portion of the operator interface device 44 may include a graphical display to reflect the status and/or performance of the machine 10 or systems or components thereof to the operator. The operator interface device 44 may be one of a liquid crystal display, a CRT, a PDA, a plasma display, a touchscreen, a monitor, a portable hand-held device, or any other display known in the art. The user portion of the operator interface device 44 may further include inputs for a user to control the machine 10. The user portion may comprise a keyboard, steering wheel, joystick, mouse, touch screen, voice recognition device, or any other input device known in the art to allow an operator to interact with the controller 42. In an exemplary embodiment, the operator interface device 44 is disposed in the cab 15, includes the user control mechanisms, and is operable by a user during use of the machine 10. Additionally, as will be explained below, the operator interface device 44 may allow a user to adjust the settings of the machine 10 so as to raise or lower a total target track slip value.

The controller 42 is connected to the operator interface device 44 such that a user may select an operating mode using the operator interface device 44. For example, the user may select a drive mode on the operator interface device 44 corresponding to the controller 42 settings which would provide for a more conservative or more aggressive operation. Additionally, if the operator interface device 44 includes the control mechanisms, the controller 42 may then affect the operation of the engine 20 and related drive train components accordingly to correspond with the requested manipulation. If the controller 42 receives signals relating to the raw data values of ground speed, chassis pitch, output speed of the transmission 22, steering system input torque, and track speed, the controller 42 may analyze the signals to calculate or otherwise determine the appropriate values. The controller 42 is also controllably connected to the engine 20 and may limit or otherwise reduce the output torque of the engine 20 to a total engine torque limit which it may determine, as will be described below.

The controller 42 may include appropriate hardware or software for performing such analysis or for controlling the machine 10. In a preferred embodiment, the controller 42 may include a processor and a computer readable memory connected by a bus. The processor 70 may be any of a number of known computer processor architectures, including, but not limited to, single chip processors or conventional computer architectures. The computer readable memory may be any combination of volatile and non-volatile memory, including rotating media, flash memory, conventional RAM, ROM or other non-volatile programmable memory, but does not include carrier waves or other propagated media. The controller 42 may also include a communication port providing support for communication with external devices, such as an engine computer or radio for communication with an external system, via a network.

In operation, the engine 20 provides an output torque which rotates the traction devices 12 and thereby propels the machine 10, which, for track-type tractors, is effectuated by applying force to or otherwise moving material under the machine 10. For tractor-type tractors, the tracks 12 are continuous and generally in the shape of a horizontally elongated loop and have vertical elements which extend outward from the outer surface of the track. As the tracks rotate, the vertical elements at the surface contacting portion of the tracks 12 pull backwardly on the ground and thereby propel the machine 10 forward. For wheel-based machines, the wheels rotate and the friction between the ground and the wheels propels the machine 10 forward.

Due to a number of factors, such as soil composition and axial load applied to the machine 10, the rotational devices 12 may rotate faster than the machine 10 moves forward, resulting in track slip or track slippage. During track slip, the rotational devices 12 have a rotational track speed which is greater than the ground velocity of the chassis 14. In certain circumstances, the track slip may result in the traction devices 12 spinning out or rotating while the chassis 14, and machine 10 in general, do not move or do not move as fast as desired. In such situations, unless manually adjusted by a user, the engine 20 will continue to supply the same level of torque to the traction devices 12 even though the chassis 14 is not moving at a desired speed. The additional output of the engine 20 and rotation of the tracks 12 results in wasted fuel and may result in damage to the undercarriage of the machine 10 and rotational devices 12.

Track slip generally occurs when the lateral, forward force created by the traction devices 12 and the ground is insufficient to propel the machine 10 forward along the surface. Typically, track slip is the result of soil composition (e.g., if the soil is too loose for the traction devices 12 to grip and subsequently propel the machine forward) or a heavy load applied to the machine 10 (e.g., the blade of a bulldozer is pushing a heavy pile of dirt). Track slip is also more likely to occur when the machine 10 is moving uphill as there is less gravitational normal force acting on the machine. Gravitational normal force helps to maintain traction between the machine 10 and the ground.

Figure 3:
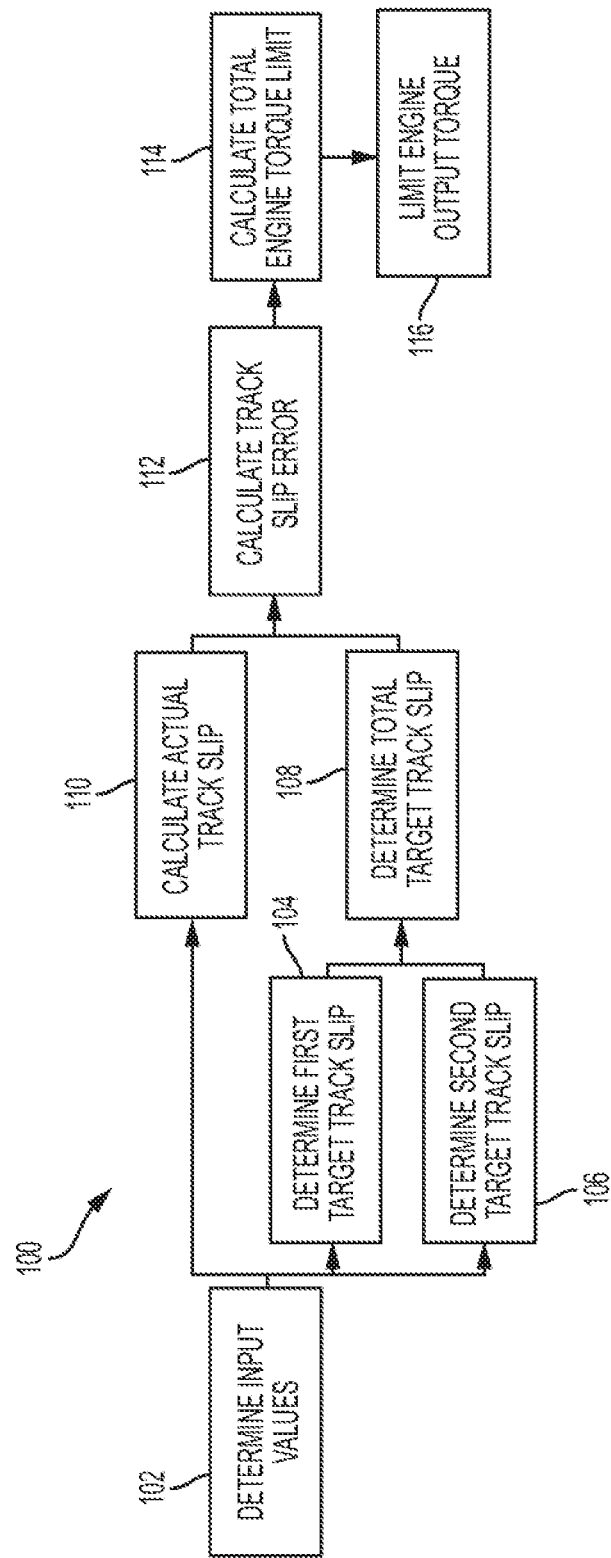
FIG. 3 is a flow chart illustrating a method of limiting engine output torque based on a difference between target track slip and measured track slip.

Turning to FIG. 3, a flowchart is depicted which illustrates an exemplary embodiment of a method 100 of limiting or otherwise controlling the torque or output of the engine 20 to minimize or prevent track slip, and may be implemented with the system of FIG. 1.

As shown in box 102, the input values are determined. Values for track speed, ground speed, and chassis pitch are calculated or otherwise determined. In a preferred method, track speed is measured or otherwise calculated by the traction device speed sensor 40, the ground speed is calculated by the ground speed sensor 30, and the chassis pitch is calculated by the chassis pitch sensor 32. In a further preferred embodiment, an input value for the steering system torque is determined by the steering system input torque sensor 36. In a still further preferred embodiment, an input value for the output speed of the transmission 22 is determined by the transmission output speed sensor 34.

In an exemplary embodiment, the determined input values are calculated by the respective sensors and sent to the controller 42 as signals indicative of the corresponding values. However, as described above, the raw data for the values may be measured by the respective sensors, sent to the controller 42 as signals indicative of the raw input values, and the input values may be subsequently calculated or determined by the controller 42.

In steps 104 and 106, first and second target track slip values are determined. The first and second target track slip values are calculated or otherwise determined from the track speed and chassis pitch, respectively. The first target track slip is a target or goal amount of track slip the machine 10 should have based on the measured track speed. The second target track slip is a target or goal amount of track slip the machine 10 should have based on the measured chassis pitch.

In a preferred method, the controller 42 receives a signal from the at least one traction device speed sensor 40 containing the track speed of the traction device 12 and a signal from the chassis pitch sensor 32 containing the chassis pitch of the machine 10. However, it will be appreciated that the controller 42 may receive raw data from the traction device speed sensor 40 and chassis pitch sensor 32 and then calculate the track speed and chassis pitch. In a further preferred embodiment, the controller 42 compares the track speed to a first algorithm or predetermined chart or graph to determine the first target track slip, and compares the chassis pitch to a second first algorithm or predetermined chart or graph to determine the corresponding second target track slip.

In step 104, the first target track slip is calculated or otherwise determined by the controller 42 by determining a target track slip for the track speed of the traction devices 12 measured by the traction device speed sensor 40 based on a first algorithm or predetermined chart or graph. The controller 42 either calculates the first target track slip by entering the track speed into a first algorithm or determines the first target track slip by finding the corresponding target track slip on a first chart or graph.

Figure 4:
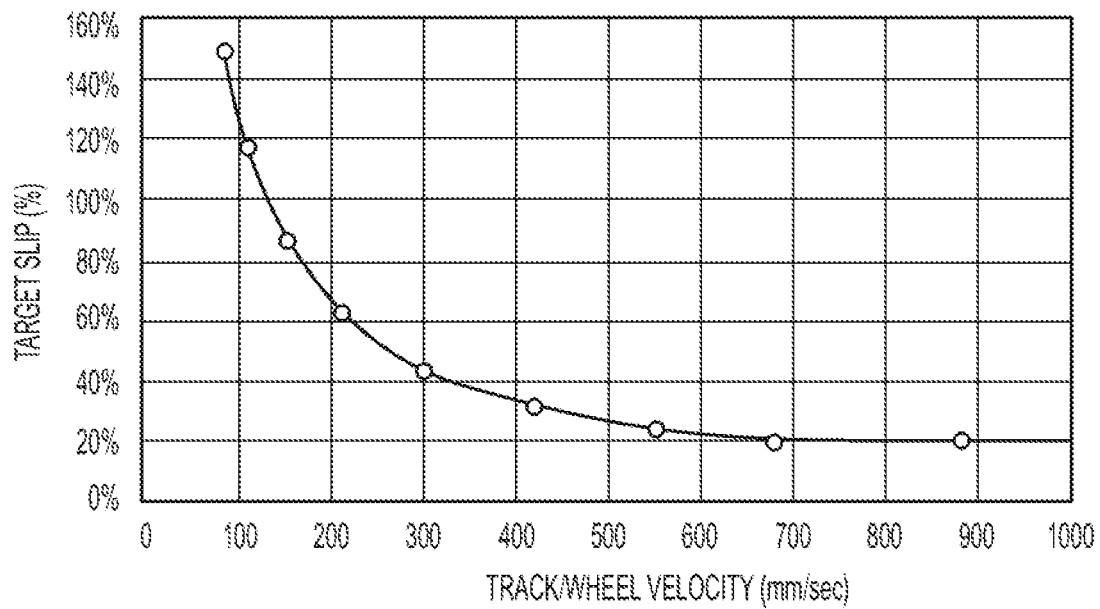
FIG. 4 is a chart showing exemplary first target track slip values based on a measured track velocity.

In a preferred embodiment, the first target track slip value is determined by determining a target track slip relating to the measured track speed on a first predetermined chart or graph. As shown in FIG. 4, in an exemplary embodiment, the first chart may be set such that the calculated first target track slip is high for low track velocities, decreases or regresses substantially following a curve corresponding to the inverse of the track velocity, and then is a minimum or floor value at higher velocities. As the track speed is in the denominator of the actual slip calculation, such a first chart or algorithm prevents a large difference between the actual slip and the first target track slip at lower track speeds. The correlation of the regression of first target track slip to the inverse of the track speed approximates a constant linear target track slip amount for the machine 10.

Turning back to FIG. 3, in step 106, the second target track slip is calculated or otherwise determined by the controller 42 by determining a target track slip for the chassis pitch of the chassis 14 measured by the chassis pitch sensor 32 based on a second algorithm or predetermined chart or graph. The second target track slip may vary with measured changes to the chassis pitch and is not set at predetermined values for certain ranges of chassis pitch. The controller 42 either calculates the second target track slip by entering the chassis pitch into a second algorithm or determines the second target track slip by finding the corresponding target track slip on a second chart or graph.

Figure 5:
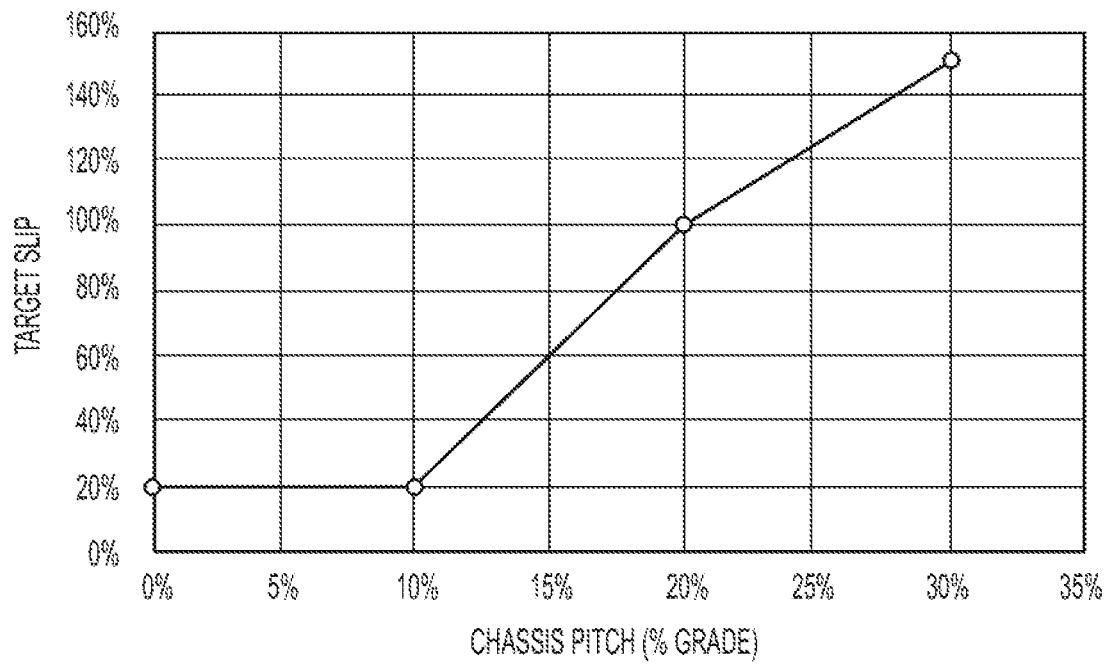
FIG. 5 is a chart showing exemplary second target track slip values based on a measured chassis pitch.

In a preferred embodiment, the second target track slip value is determined by determining a target track slip relating to the measured chassis pitch on a second predetermined chart or graph. As shown in FIG. 5, in an exemplary embodiment, the second chart may be set such that the second target track slip is at a floor or minimum value when the measured chassis pitch is slight and when the chassis pitch is large, indicating the machine 10 is moving up an incline, the second target track slip value is very high. As will be described below, by pushing the second target track slip to a high value when the chassis pitch is over a threshold value, an overall target track slip will be high when the machine 10 is traveling uphill and the torque output of the engine will not be needlessly reduced. Additionally, when the chassis pitch indicates that the machine 10 is going downhill (e.g., the chassis pitch is negative), the second target track slip will be the floor or minimum value.

In a further preferred embodiment, the second target track slip has a minimum value for a chassis pitch below about 10%. The second target track slip then increases linearly for increases in chassis pitch until a chassis pitch of about 20% where the corresponding second target track slip value is about 100%. The second target track slip then further increases linearly for increases in chassis pitch until a chassis pitch of about 30% where the corresponding second target track slip value is about 150%.

Exemplary charts used to calculate first and second target track slips are depicted in FIGS. 4 and 5, respectively. In an exemplary embodiment, the first and second target track slips have a maximum value between about 130% and 170%, such as between about 140% and 160%, such as about 150%, and a minimum value between 0% and 40%, such as between about 10% and 30%, such as about 20%.

Turning back to FIG. 3, in step 108, an overall or total target track slip is determined. The total target track slip is calculated or otherwise determined by the controller 42 based on the first and second target track slips. In a preferred method, the overall target track slip is calculated as the larger of the first and second target track slips. Accordingly, the overall target track slip will be large whenever either the track velocity is low (when the first target track slip is high) or the chassis pitch is high (when the second target track slip is high).

In a preferred embodiment, the overall target track slip may be adjustable by a user, either directly or indirectly. For example, a user may select an operating mode on the operator interface device 44, corresponding to standard operation, a conservative operation with lower target track slips, an aggressive operation with higher target track slips, or any number of other settings.

While the overall target track slip has been described as being determined based on first and second target track slips, other embodiments are contemplated. For example, the overall target track slip may be determined from only one of the first and second track slips. Additionally, the overall target track slip may be determined based on target track slips in addition to the first and second target track slips. For example, the overall target track slip may be determined from one or more target track slips based on a measured weight of a load acting on the machine 10 or the density and/or consistency of the ground surface, and may be used with first and/or second target track slips, in any variation or combination thereof.

In step 110, the measured or actual track slip is determined. In a preferred embodiment, the actual track slip is calculated using the track speed (Vt) of the traction devices 12 and ground velocity (Vg). The actual track slip (S) is the ratio of the difference between the track velocity (Vt) and ground velocity (Vg) compared to the track velocity (Vt) represented by the equation:

$$S = \frac{Vt - Vg}{Vt}.$$

Accordingly, when the traction devices 12 are not slipping, the track speed is the same as the ground speed and the actual slip is zero, and when the traction devices 12 are experiencing complete slippage, the ground speed is zero and the actual slip is one. Additionally, as the actual slip is calculated as a ratio of the track speed, for the same difference between track speed and ground speed, the actual slip will be larger when the track speed is lower.

In a preferred embodiment, the controller 42 receives a signal from the ground speed sensor 30 containing the ground speed and a signal from the traction device speed sensor 40 containing the track speed, and calculates the actual slip.

In step 112, track slip error is calculated. The track slip error is the difference between the total target track slip and the measured track slip and which may be used to limit the output of the engine 20. The slip error determines whether the measured or actual track slip of the machine 10 is within or exceeds the total target track slip based on the observed track speed and chassis pitch. In a preferred embodiment, the slip error is calculated as the total target track slip minus the measured slip. As will be explained below, if the measured slip is below the total target track slip, the initial output torque of the engine 12 may remain at the initial level. However, if the measured slip exceeds the total target track slip, the output torque of the engine 20 will be limited to prevent unneeded slip.

As discussed above, the measured slip will be larger when track speed is small for the same linear speed slip. Also, track slip occurs frequently when the machine 10 is moving uphill as the amount of gravitational normal force acting on the machine 10 is reduced. However, the track slip that occurs when the machine 10 is moving uphill is generally necessary to produce sufficient force to propel the machine 10. Accordingly, determining a high total target track slip when either the track speed is low or the chassis pitch is high prevents the measured track slip from being larger than the total target track slip. As will be explained below, this thereby prevents the engine 20 output from being needlessly limited by the controller 42.

Next, as shown in step 114, a final or total engine torque limit is calculated. The total engine output torque limit is calculated or otherwise determined by the controller 42 based on the received inputs or signals. The total engine torque limit determined by the controller 42 corresponds to the maximum torque the engine 20 may output such that the track speed of the traction devices 12 would nearly match the ground speed of the chassis 14, as some amount of track slip is necessary to move the machine 10.

In a preferred embodiment, the controller 42 first calculates a propulsion engine torque limit from the track slip error and the previous propulsion torque limit to determine a maximum output torque of the engine 20 which will correspond to the lesser amount of torque required to prevent the actual track slip from being greater than the total target track slip. The higher the calculated slip error, the lower the propulsion engine torque limit would be. If the controller 42 determines that there is no track slip or that the actual track slip is within the total target track slip, then the propulsion engine torque limit would substantially be at or above the operating output of the engine, minus the torque required for steering.

In a further preferred embodiment, the propulsion engine torque limit is calculated by the controller 42 and is determined based on the slip error and a preset integral control gain which will determine how aggressive or stable the system will be. In a preferred embodiment, the integral control gain is a constant value which represents the amount of engine torque limit change per slip error. However, the integral control gain may vary based on a number of factors, such as transmission torque. In an exemplary embodiment, the integral control gain is multiplied by the error signal to determine how much the torque limit with either go up or down for each time step.

In a still further preferred embodiment, the steering system torque measured by the steering system input torque sensor 36 is added to the propulsion engine torque limit to calculate or otherwise determine the total engine torque limit. The steering system torque is the amount of torque determined by the steering system input torque sensor 36 to be required to adequately steer the machine 10 (e.g., turn the machine 10 left or right). As the steering system torque is factored into the total engine torque limit after the propulsion engine torque limit is calculated, the resulting total engine torque limit may account for any demands caused by steering or otherwise maneuvering the machine 10.

Additionally, the final engine torque limit may take into consideration other factors or operations which draw torque from the engine 20. For example, if the work implement 18, or a pump which operates the work implement 18, draws torque from the engine 12, the torque required to operate the work implement 18 may be added to the propulsion engine torque limit and steering pump torque to determine the final engine torque limit.

Finally, as shown in step 116, the output torque of the engine 20 is limited. The initial output torque of the engine 20 is limited or decreased to the total engine torque limit determined by the controller 42. After calculating the total engine torque limit, the controller 42 sends a control signal to the engine 20 which sets the maximum output torque of the engine 20 to the total engine torque limit. As a result, if the measured track slip was greater than the total target track slip, the engine 20 will cease to output excess torque, the traction devices 12 will rotate more slowly, and track slip will be reduced.

INDUSTRIAL APPLICABILITY

The disclosure is applicable to a machine 10, such as a track-type tractor machine, and specifically to automatically controlling or otherwise adjusting the output, with engine control systems in general, and specifically to automatically adjusting the torque limit of the engine 20 of the machine 10 to reduce track or wheel slippage. When the traction devices 12 (tracks or wheels) of the machine 10 do not sufficiently grip the ground and provide enough force to propel the machine 10 forward, the traction devices 12 rotate without the machine 10 being propelled forward as fast as desired, which may result in lower fuel economy and damage to the undercarriage of the machine 10. Instead of manually decelerating the machine 10, particularly while an operator is concurrently controlling work implements 18 under a load, a system on board the machine 10 may reduce the initial output torque of the engine 20 to reduce the track slippage.

The method and system disclosed permit a continuous adjustment of the torque output of the engine 20, such that minimal fuel is wasted in track slippage and there is less damage to the undercarriage of the machine 10. Additionally, when the machine 10 is traveling uphill, despite the actual or measured slip, the calculated total target track slip is sufficiently high that the output torque of the engine 20 will not be needlessly decreased. Further, the method and system factors in the torque required to steer the machine 10 and other demands such that the operation and performance of the machine 10 is not unduly hindered.

Track slippage occurs when the traction device 12 of a machine 10 are rotating or otherwise moving at a faster rate than the machine 10 is moving. Unless accommodated for, the engine 20 then continues to output torque at the same rate which results in wasted fuel because the engine output is not being utilized. Also, as the traction devices 12 are still rotating without the machine 10 moving as fast as desired, the track slip increases wear on the undercarriage of the machine 10 and the traction devices 12. By monitoring track speed and ground speed Vg to prevent track slippage, fuel economy may be increased and wear to the undercarriage of the machine 10 and traction devices may be reduced.

Previously known methods of reducing track slip involved a user manually decreasing engine output, such as by controlling a lever on the machine 10, when the user observed the traction devices 12 rotating faster than the machine 10 was moving. However, manually accommodating for track slip is a difficult skill to learn and requires considerable experience and mental focus. By automatically measuring track speed and ground speed to determine the amount of track slip and factoring in all torque demands on the engine 20 to determine the total engine torque limit, track slip may be reduced without a user manually decreasing the engine torque. Automatically adjusting the torque of the engine 20 permits less experienced users to operate the machine 10 without track slip, reduces user fatigue while operating the machine 10, and increased ease of use of the machine 10.

Additionally, track slip is more common when the machine 10 is moving uphill as the amount of gravitational normal force acting on the machine 10 is reduced. However, the track slip that occurs when the machine 10 is travelling up an incline is generally necessary as any reduction in engine output to reduce track speed in such situations may make the machine 10 more difficult to operate or even prevent the machine 10 from moving up the incline. By determining a large total target track slip, such as one above any possible actual track slip calculation, when the machine 10 is traveling up a sufficiently steep incline, determined by a measured chassis pitch, the controller 42 will calculate a high total engine torque limit which will not hinder the engine output. As such, by setting the target track slip at a high value when the machine 10 is traversing a steep incline, the engine 20 may continue to output enough torque to propel the machine 10 up the incline.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A method for controlling an engine torque of a machine having an engine initially operating at an initial output torque, the method comprising:
   calculating a first target track slip from a track speed of a traction device of the machine;
   calculating a second target track slip from a chassis pitch of the machine;
   calculating an actual track slip from the difference between the track speed and a ground speed of the machine;
   determining a total engine torque limit based on a difference between the actual track slip and the first target track slip; and
   limiting the initial output torque to the total engine torque limit.

2. The method of claim 1, wherein the ground speed is calculated from a GPS.

3. The method of claim 1, wherein the total engine torque limit is also based on a difference between the actual track slip and the second target track slip.

4. The method of claim 1, wherein the total engine torque limit is based on a difference between the actual track slip and the larger of the first target track slip and second target track slip.

5. The method of claim 1, wherein the initial output torque is not decreased when the chassis pitch is above 20%.

6. The method of claim 1, wherein the total engine torque limit is the combination of a steering system input torque and a propulsion engine torque limit determined from a difference between the actual track slip and the larger of the first target track slip and the second target track slip.

7. The method of claim 6, wherein the propulsion engine torque limit is further determined from an integral control gain.

8. The method of claim 1, wherein the first target track slip is highest at low track velocities.

9. The method of claim 1, wherein the first target track slip decreases to increases in track speed.

10. The method of claim 1, wherein the second target track slip is always higher than the first target track slip when the chassis pitch is at least 30%.

11. The method of claim 1, wherein the total engine torque limit may be any amount of torque between zero and a maximum torque of the engine.

12. A system for controlling track slip of a track-type tractor having continuous tracks and an engine initially operating at an initial output torque, the system comprising:
   a traction device speed sensor that provides a signal indicative of a track speed of the track-type tractor;
   a ground speed sensor that provides a signal indicative of a ground speed of the track-type tractor;
   a steering system input torque sensor that provides a signal indicative of a steering system torque of the track-type tractor; and
   a controller operably connected to the traction device speed sensor, the ground speed sensor, the steering system input torque sensor, and the engine;
   wherein the controller receives the signals for the track speed, the ground speed, and the steering system torque, wherein the controller is configured to calculate a total engine torque limit from the received signals, wherein the controller sends a control signal to the engine which limits the initial output torque to the total engine torque limit, and wherein the controller is further configured to calculate a propulsion engine torque limit from the received track speed, chassis pitch, and ground speed signals.

13. The system of claim 12, wherein the ground speed sensor determines a ground speed using a GPS.

14. The system of claim 12, further comprising a chassis pitch sensor that provides a signal indicative of a chassis pitch of the track-type tractor; and
   wherein the controller is also operably connected to the chassis pitch sensor.

15. A machine for performing a work function, the machine comprising:
   at least one traction device which contacts a ground and may rotate about a chassis of the machine;
   an engine capable of producing an output torque;
   a chassis pitch sensor that produces a signal indicative of a chassis pitch of the machine;
   a traction device speed sensor that produces a signal indicative of a track speed of the at least one traction device;
   a ground speed sensor that produces a signal indicative of a ground speed of the machine;
   a controller operatively connected to the engine, the at least one traction device, the chassis pitch sensor, and the ground speed sensor;
   wherein the controller may receive the signals produced by the chassis pitch sensor, the traction device speed sensor, and the ground speed sensor, the controller may determine a total engine torque limit from the received signals, and the controller may send a control signal to the engine which limits the output torque of the engine to the total engine torque limit.

16. The machine of claim 15, wherein the machine further comprises a steering system input torque sensor capable of producing a signal indicative of a steering system input torque and operatively connected to the controller;

wherein the controller may receive the signal produced by the steering system input torque sensor and further determine the total engine torque limit from the signal produced by the steering system input torque sensor.

17. The machine of claim 15, wherein the ground speed sensor determines the ground speed by GPS.

18. The machine of claim 16, wherein the controller determines the total engine torque limit from a difference between a total target track slip determined from the chassis pitch and track velocity signals and an actual track slip determined from the track speed and ground speed signals.

* * * * *